Patented Oct. 21, 1930

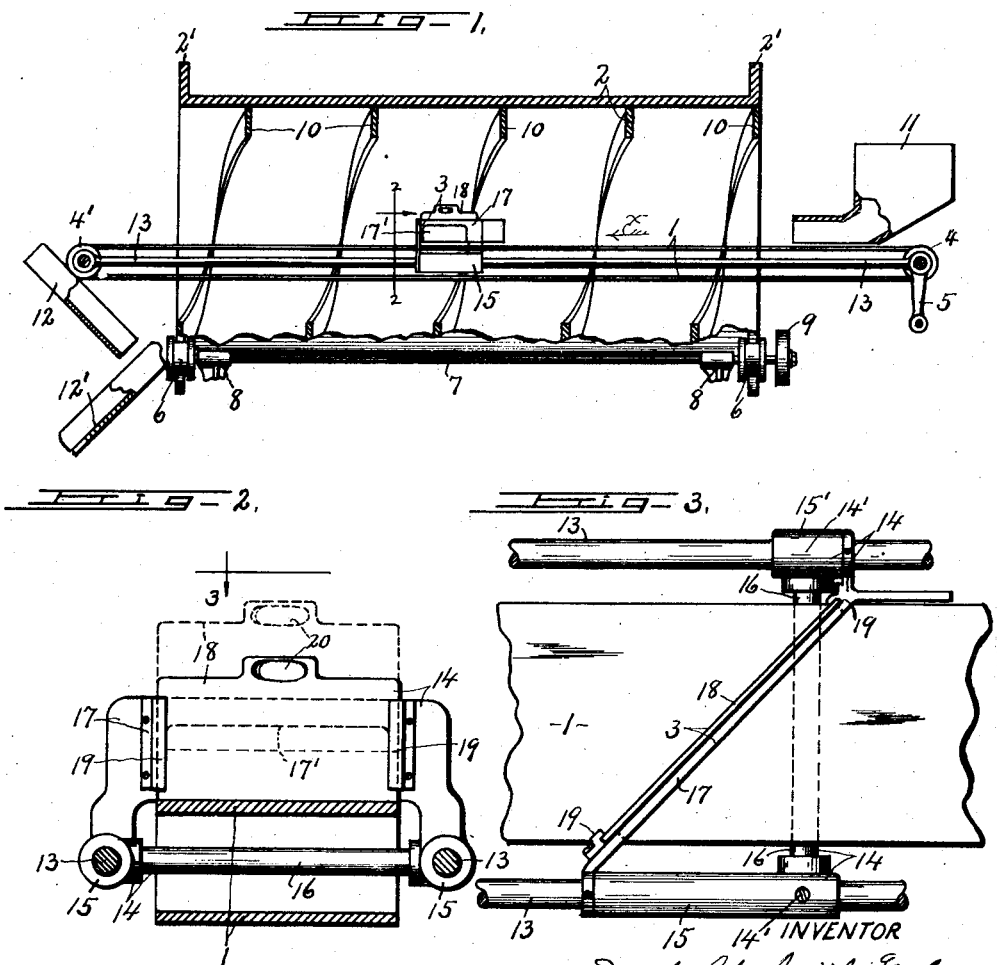

1,779,194

UNITED STATES PATENT OFFICE

DAVID R. C. SMITH AND JOHN H. COULTER, OF CANASTOTA, NEW YORK

CONVEYER MECHANISM

Application filed May 31, 1929. Serial No. 367,363.

This invention relates to a conveyer mechanism for transporting articles from one place to another and for subjecting said articles to certain treatment in transit without appreciable interruption in their travel and is particularly useful in machines for weighing and packaging onions and other vegetables of the class set forth in our pending application, Serial No. 355,274, filed April 15, 1929.

The main object of the present invention is to associate with separate but co-related conveyers, suitable means for automatically deflecting the articles carried by one conveyer into or upon the other conveyer and to provide the last-named conveyer with means for agitating or tumbling the articles therein and to simultaneously feed the articles therefrom.

In other words, we have sought to provide means for automatically discharging the articles from the primary conveyer into different portions of a secondary conveyer so as to vary the time period of agitation of the articles in transit through the secondary conveyer.

One of the specific objects is to extend an endless conveyer endwise through a rotary tubular conveyer and to provide means for displacing the articles carried by the endless conveyer at different points in transit through the rotary conveyer so as to vary the distance of travel of said articles by and through the tubular conveyer.

Other objects and uses relating to specific parts of the apparatus will be brought out in the following description.

In the drawings:—

Fig. 1 is a longitudinal sectional view, partly in elevation, of an apparatus embodying the various features of our invention.

Fig. 2 is an enlarged detail sectional view taken in the plane of line 2—2, Fig. 1, showing more particularly the means for deflecting the articles from the endless conveyer.

Fig. 3 is an enlarged top plan of a portion of the upper side of the conveyer belt and the device for deflecting the articles therefrom.

As illustrated, this apparatus comprises an endless conveyer —1—, a rotary tubular conveyer —2— and a deflecting device —3— for displacing the articles from the primary conveyer into the secondary conveyer together with suitable mechanisms for rotating the primary and second conveyers, and additional means for depositing the articles to be conveyed upon the primary conveyer.

The primary conveyer —1— consists, in this instance, of an endless belt mounted in a substantially horizontal position upon longitudinally spaced supporting drums —4— and —4'—, one of which is provided with a hand-crank —5— for rotating the same and thereby moving the belt in the direction indicated by arrow —x— although it is evident that any other suitable driving means may be provided without departing from the spirit of the invention.

The secondary conveyer —2— preferably consists of a tubular shell elongated in the direction of its axis and having its opposite ends provided with out-turned peripherial flanges —2'— adapted to rest upon underlying grooved rollers —6— which in turn are mounted upon parallel lengthwise shafts —7—, the latter being journaled in relatively stationary bearings —8—, one of said shafts being provided with a pulley —9— for rotating the same thereby imparting a rotary motion to the drum —2— through the medium of the rollers —6— carried by the driving shaft.

The rollers —6— are preferably arranged in pairs, one pair at each end of the tubular drum —2— for supporting the latter in a substantially horizontal position.

This tubular drum —2— is provided with internal spiral ribs or veins —10— projecting inwardly from the peripherial walls thereof in uniformly spaced relation lengthwise of the drum for feeding the articles deposited therein from end to end thereof and for discharging the same at one end of the drum.

The spiral ribs —10— are relatively shallow radially as compared with the interior diameter of the drum so as to leave a clear open space therethrough from end to end of the drum for the reception of the primary conveyer —1— without interfering with the free operation of either of the conveyers.

That is, the primary conveyer belt —1— extends endwise through and beyond the opposite ends of the tubular conveyer —2— with its upper side close to and parallel with the axis of the tubular conveyer for receiving and conveying the articles deposited thereon into said tubular conveyer in a manner hereinafter described.

A hopper or reservoir —11— is supported in any suitable manner in a plane above the receiving end of the conveyer belt —1— for discharging the onions or other articles to be conveyed on to the upper side of said belt to be transported into the interior of the tubular conveyer —2—.

Suitable guide chutes —12— and —12'— are arranged in reversely inclined planes one above the other and at the rear end of the conveyer belt —1— for receiving the articles from the upper side thereof and discharging them into suitable receptacles, not shown.

The drums —4— and —4'— are journaled in the opposite ends of a pair of lengthwise guide bars —13— which are arranged at opposite sides of and parallel with the intervening portions of the conveyer belt —1— and constitutes a supporting frame for said drums and belt and suitable deflecting mechanism hereinafter described.

These bars may be supported in any suitable manner in a fixed position relatively to the conveyer belt —1— and drum —2—, it being understood that the guide rods —13— are also extended lengthwise through the interior of and beyond the opposite ends of the drum —2—.

Suitable means is provided for deflecting or displacing the articles from the upper side of the conveyer belt at different points in the travel thereof through the conveyer tube —2— and for this purpose a cross-head —14— is mounted upon the guide rods —13— for longitudinal movement along and upon said rods within the conveyer tube —2— as shown more clearly in Figs. 2 and 3.

The cross-head —14— comprises opposite tubular members —15— and —15'— slidable along and upon their respective guide rods —13— and connected by a cross-bar —16— and a diagonally extending frame —17— overlying the upper side of the conveyer belt —1—, the cross-bar —16— being disposed at right angles to the guide rods —13— and extended laterally between the lower and upper sides of the belt in spaced relation thereto to avoid friction therewith.

The frame —17— extends diagonally across the upper side of the belt —1— at an angle approximately forty-five degrees more or less relatively to the line of travel of the belt and is provided in its lower side with an opening —17'— extending from edge to edge of the upper side of the belt and of sufficient height to permit the passage of articles on the belt therethrough.

This opening —17'— is controlled by a vertically movable gate or closure —18— which is also arranged at the same angle as the frame —17— and is guided thereon in its vertical movement in guide-ways —19—, Figs. 2 and 3.

The gate or closure —18— is provided near its upper edge with a handle —20— by which it may be raised and lowered at will.

As previously stated, the cross-head —14— upon which the deflecting plate —3— is mounted is adjustable along and upon the guide rails —14— for varying the place of discharge of the articles from the upper surface of the belt —1— into the drum —2— and thereby to vary the distance of travel or time period of agitation or tumbling of the articles within the drum before being discharged therefrom, said cross-head being held in its adjusted position by one or more set-screws —14'— carried by the tubular heads —15— and —15'—, as shown in Fig. 3.

*Operation*

The articles to be treated, such as onions, are placed within the hopper —11— from which they are fed by gravity on to the upper surface of the receiving end of the belt —1— and are then conveyed by said belt into the drum —2— to be discharged from said belt into the interior of the drum at some point in the length thereof according to the position of the cross-head —14—, which position is predetermined by the condition of the articles to be operated upon within the drum.

The apparatus shown is designed particularly for the removal of husks and loose outer layers of onions and the like preparatory to packaging the same and it is well known that the amount and looseness of the husks and external layers varies materially with the time of exposure of the onions after harvesting and therefore the time period required for the removal of the husks by agitation and (or) tumbling of the onions within the rotary conveyer —2— will have to be varied accordingly by proper adjustment of the deflector —3— along the conveyer belt —1— and relatively to the receiving end of the conveyer drum —2—.

That is, if the external husks or outer layers of the onions are exceedingly dry and therefore more or less loose, they will require a longer period of tumbling by and within the conveyer drum —2— to remove the husks under which condition the deflector —3— would be adjusted to a position near the receiving end of the conveyer drum —2— for discharging the onions from the belt into the conveyer drum at a corresponding position and thereby to cause the tumbling and agitation of the onions by and within the conveyer drum throughout the major portion of the length thereof which is sufficient to remove the husks before discharging the husked onions together with the husks at the distal end of the conveyer drum, it being understood that the rotation of the drum together with the gravity and inertia of the onions causes said onions to be agitated and tumbled against each other and simultaneously conveyed endwise from the point of deposit of the onions therein by the deflector to the point of discharge of the husks and onions from the conveyer drum.

Again, if the husks of the onions in general placed within the hopper —11— are only slightly loose, the cross-head —14— may be adjusted and set farther from the receiving end of the conveyer drum for displacing the onions from the belt into the drum nearer the discharge end thereof thereby shortening the period of tumbling and agitation and at the same time assuring the removal of the husks before discharging the onions from the belt.

On the other hand, if the onions deposited upon the receiving end of the conveyer belt —1— are fresh and therefore sufficiently solid for packaging purposes, the gate —18— may be opened to the position shown by dotted line in Fig. 2 to allow the onions to be fed by the belt —1— through said opening and to be discharged at the distal end of the belt without depositing any of the onions within the conveyer drum —2—.

When the onions are deposited in the drum for agitation and tumbling therein to remove the husks, they will be discharged into the lower chute —12—.

On the other hand, if the gate —18— is opened, the onions will be carried by the belt —1— entirely through the conveyer drum —2— and discharged into the upper chute —12— which in turn discharges into the lower chute so that the articles may be collected directly from the lower chute into a receptacle, not shown.

It is, of course, understood that the loose husks and dust or dirt which may be discharged from the drum —2— or belt —1— will be removed by a blower or other separator similar to that set forth in our pending application previously referred to.

The apparatus shown and described is particularly efficient for carrying out the objects stated but obviously may be modified in many of its details without departing from the spirit of this invention.

What we claim is:—

1. In a conveyer mechanism, a rotary tubular drum, means for conveying articles into and through the drum lengthwise thereof, and means adjustable lengthwise of and within the drum for discharging the articles from the conveyer means into the drum at different positions.

2. In a conveyer mechanism, a rotary tubular drum, means for conveying articles into and through the drum lengthwise thereof, and means adjustable lengthwise of and within the drum for discharging the articles from the conveyer means into the drum at different positions, said drum being rotatable and provided with means for discharging the articles therefrom.

3. In a conveyer mechanism, a rotary tubular drum, an endless conveyer belt movable lengthwise of and within the drum for receiving and conveying articles thereon, and a deflector plate supported within the drum and movable toward and from the belt for deflecting the articles therefrom into the drum when in one position and for permitting the feeding of the articles past said plate when the latter is moved to another position.

4. In a conveyer mechanism, a rotary tubular drum, an endless conveyer belt movable lengthwise of and within the drum for receiving and conveying articles thereon, a deflector plate supported within the drum and movable toward and from the belt for deflecting the articles therefrom into the drum when in one position and for permitting the feeding of the articles past said plate when the latter is moved to another position, said drum having internal means for discharging the articles as it is rotated.

5. In a conveyer mechanism, a rotary tubular drum, a conveyer belt extending through and beyond the opposite ends of the drum and movable lengthwise for conveying articles into and through the drum, means at the receiving end of the drum for depositing the articles on the belt, means for rotating the drum, means for driving the belt, a guide extending lengthwise of the belt within the drum, a cross-head slidable along and upon the guide within the drum and provided with an opening for the article-carrying side of the belt extending a sufficient distance above said side to permit the articles to be carried therethrough by the belt, and a closure for said opening arranged when closed to deflect the articles from the belt into the drum, said drum having internal means for discharging the articles therefrom.

In witness whereof we have hereunto set our hands this 25th day of May, 1929.

DAVID R. C. SMITH.
JOHN H. COULTER.